US012472528B2

(12) United States Patent
Kuwayama et al.

(10) Patent No.: US 12,472,528 B2
(45) Date of Patent: Nov. 18, 2025

(54) APPARATUS FOR COATING AN AUTOMOBILE, METHOD FOR COATING AN AUTOMOBILE, AND COMPUTER PROGRAM PRODUCT

(71) Applicant: TOYOTA SHATAI KABUSHIKI KAISHA, Kariya (JP)

(72) Inventors: Toshiki Kuwayama, Kariya (JP); Naohide Ishikawa, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 112 days.

(21) Appl. No.: 17/796,940

(22) PCT Filed: Sep. 30, 2020

(86) PCT No.: PCT/JP2020/037339
§ 371 (c)(1),
(2) Date: Aug. 2, 2022

(87) PCT Pub. No.: WO2021/157128
PCT Pub. Date: Aug. 12, 2021

(65) Prior Publication Data

US 2023/0061532 A1 Mar. 2, 2023

(30) Foreign Application Priority Data

Feb. 6, 2020 (JP) ................................ 2020-018884

(51) Int. Cl.
*B05B 12/04* (2006.01)
*B05B 13/04* (2006.01)
(Continued)

(52) U.S. Cl.
CPC ................ *B05C 5/02* (2013.01); *B05B 12/04* (2013.01); *B05B 13/0431* (2013.01); (Continued)

(58) Field of Classification Search
None
See application file for complete search history.

(56) References Cited

U.S. PATENT DOCUMENTS 9,527,275 B1 * 12/2016 Flannigan .............. B41J 3/4073
10,150,304 B2 12/2018 Herre et al.
(Continued)

FOREIGN PATENT DOCUMENTS

JP 9-193368 A 7/1997
JP 11-245384 A 9/1999
(Continued)

OTHER PUBLICATIONS

Nov. 24, 2020 International Search Report issued in PCT/JP2020/037339.
Nov. 24, 2020 Written Opinion issued in PCT/JP2020/037339.

*Primary Examiner* — Binu Thomas
(74) *Attorney, Agent, or Firm* — Oliff PLC

(57) ABSTRACT

A coating apparatus includes a discharge unit, a moving unit, and a controller. The discharge unit includes a nozzle array with a plurality of nozzles, and is configured to discharge a coating material from each of the plurality of nozzles. The moving unit is configured to move a position of the discharge unit with respect to a to-be-coated surface along a plurality of paths. The controller is configured to determine, based on coating information, a width of a recoated portion on which the coating material is discharged in an overlapping manner between two adjacent paths among the plurality of paths, and determine a discharge amount from each of the plurality of nozzles so that a discharge amount from each of nozzles at an end portion of the nozzle array corresponding to the recoated portion is less than a discharge amount from each of other nozzles of the nozzle array.

4 Claims, 4 Drawing Sheets

(51) Int. Cl.

| | |
|---|---|
| ***B05C 5/02*** | (2006.01) |
| ***B05C 11/00*** | (2006.01) |
| ***B05C 11/10*** | (2006.01) |
| ***B05D 1/26*** | (2006.01) |

(52) U.S. Cl.

CPC .............. *B05C 5/027* (2013.01); *B05C 11/00* (2013.01); *B05D 1/26* (2013.01); *B05C 11/1005* (2013.01)

(56) References Cited

U.S. PATENT DOCUMENTS

| | | | | |
|---|---|---|---|---|
| 10,814,643 | B2 | 10/2020 | Herre et al. | |
| 11,241,889 | B2 | 2/2022 | Herre et al. | |
| 2013/0257984 | A1 | 10/2013 | Beier et al. | |
| 2017/0252765 | A1* | 9/2017 | Medard | B41J 3/4073 |
| 2018/0022124 | A1* | 1/2018 | Onodera | B41J 3/4073 347/8 |
| 2018/0072068 | A1 | 3/2018 | Matsushita | |
| 2018/0169688 | A1* | 6/2018 | Medard | B05B 13/0431 |
| 2018/0336443 | A1 | 11/2018 | Kaiba et al. | |
| 2019/0272454 | A1 | 9/2019 | Kaiba et al. | |
| 2019/0374966 | A1* | 12/2019 | Thompson | B05B 13/041 |
| 2020/0207130 | A1* | 7/2020 | Matsuura | B41J 3/4073 |
| 2020/0406617 | A1* | 12/2020 | Tawata | B05B 13/0431 |

FOREIGN PATENT DOCUMENTS

| | | | |
|---|---|---|---|
| JP | 2005-7582 | A | 1/2005 |
| JP | 2005-349647 | A | 12/2005 |
| JP | 2009-175168 | A | 8/2009 |
| JP | 2013-101780 | A | 5/2013 |
| JP | 2013-202781 | A | 10/2013 |
| JP | 2016-175077 | A | 10/2016 |
| JP | 2017-192932 | A | 10/2017 |
| JP | 2018-43349 | A | 3/2018 |
| JP | 2018-94552 | A | 6/2018 |
| JP | 2018-192405 | A | 12/2018 |

* cited by examiner

APPARATUS FOR COATING AN AUTOMOBILE, METHOD FOR COATING AN AUTOMOBILE, AND COMPUTER PROGRAM PRODUCT

CROSS REFERENCE TO RELATED APPLICATIONS

This application is national stage application of International Application No. PCT/JP2020/037339, filed Sep. 30, 2020, which designates the United States, incorporated herein by reference, and which claims the benefit of priority from Japanese Application No. 2020-018884, filed on Feb. 6, 2020, the entire contents of which are incorporated herein by reference.

FIELD

Embodiments described herein relate generally to a coating apparatus, a coating method, and a computer program product.

BACKGROUND

Conventionally, a technique for coating a wide range with a plurality of paths by using inkjet nozzles is known as a technique related to automobile coating (see, for example, Japanese Patent Application Laid-open No. 2016-175077).).

SUMMARY OF THE INVENTION

Problem to be Solved by the Invention

However, depending on a trajectory accuracy of a robot that moves inkjet nozzles and a positional accuracy of a material to be coated, coating ranges may overlap or be separated between adjacent paths. Because a coating material used for the automobile coating is highly viscous, the coating material is hard to be mixed between the adjacent paths after application. For this reason, when the coating ranges overlap or are separated between the adjacent paths, there is a problem that coating quality deteriorates such as generation of streaks.

An object of the present invention is to suppress deterioration of the coating quality between the adjacent parts.

Means for Solving Problem

To solve the above-described problems and achieve the object, a coating apparatus according to an embodiment of the present invention includes a discharge unit, a moving unit, and a controller. The discharge unit includes a nozzle array in which a plurality of nozzles is arranged, and is configured to discharge a coating material from each of the plurality of nozzles. The moving unit is configured to move a position of the discharge unit with respect to a to-be-coated surface along a plurality of paths substantially orthogonal to the nozzle array. The controller is configured to determine, based on coating information, a width of a recoated portion on which the coating material is discharged in an overlapping manner between two adjacent paths among the plurality of paths, and determine a discharge amount from each of the plurality of nozzles so that a discharge amount from each of nozzles at an end portion of the nozzle array corresponding to the recoated portion is less than a discharge amount from each of other nozzles of the nozzle array.

DETAILED DESCRIPTION

Hereinafter, a coating apparatus, a coating method, and a computer program product according to an exemplary embodiment of the present invention will be described in detail with reference to the accompanying drawings.

Figure 1:
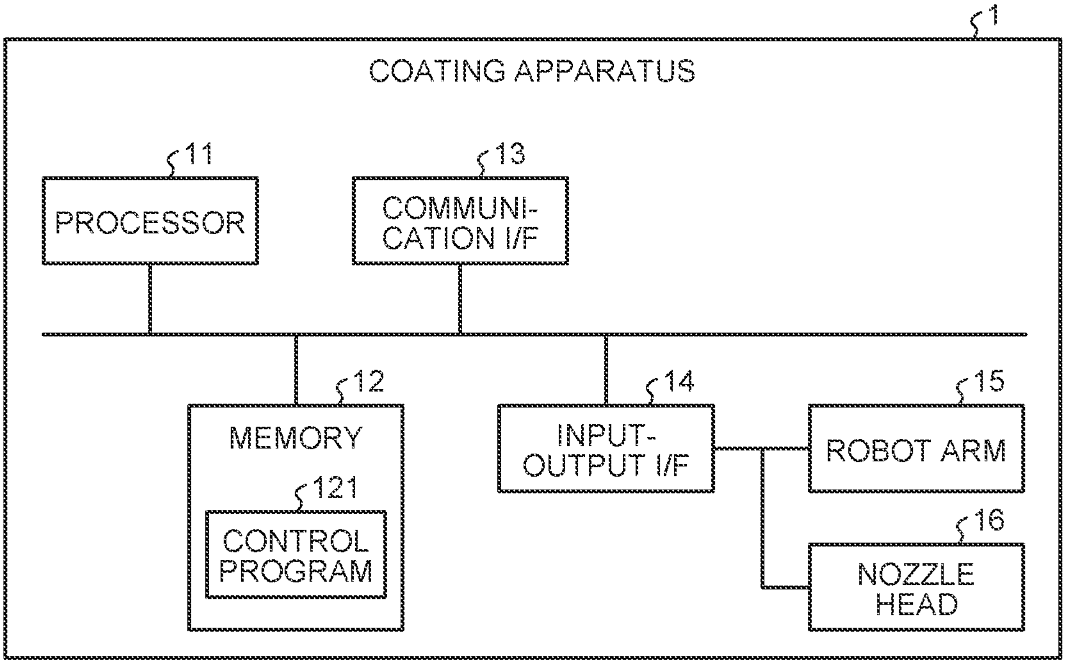
FIG. 1 is a block diagram illustrating an example of a configuration of a coating apparatus according to an exemplary embodiment.

FIG. 1 is a block diagram illustrating an example of a configuration of a coating apparatus 1 according to the exemplary embodiment. The coating apparatus 1 illustrated in FIG. 1 is a device that performs belt-like film thickness pattern recoating on a wide range of a to-be-coated surface such as an automobile. The belt-like film thickness pattern recoating is an example of dustless coating with a high coating rate, such as liquid column coating, in which coating is performed by applying a belt-like pattern in a plurality of paths.

As illustrated in FIG. 1, the coating apparatus 1 includes a processor 11, a memory 12, a communication interface (I/F) 13, an input-output interface (I/F) 14, a robot arm 15, and a nozzle head 16. The processor 11, the memory 12, the communication I/F 13, and the input-output I/F 14 are communicably connected to each other via a bus line or the like.

The processor 11 controls the entire operation of the coating apparatus 1. The processor 11 loads a control program 121 stored in a ROM or the like in the memory 12 into a RAM in the memory 12 to execute the control program 121 loaded, thereby controlling the operation of the coating apparatus 1. As the processor 11, for example, a central processing unit (CPU) is used, but other processors such as a graphics processing unit (GPU), an application specific integrated circuit (ASIC), and a field programmable gate array (FPGA) may be used.

The memory 12 is a storage area of the coating apparatus 1, and includes the random access memory (RAM) and the read only memory (ROM). The RAM is a volatile memory that is used as a working memory and stores data when the processor 11 executes arithmetic processing. The RAM temporarily stores coating information input from outside of the coating apparatus 1. The ROM is a nonvolatile memory that stores each program such as the control program 121 executed by the processor 11, and data such as parameters.

The memory 12 may include other nonvolatile memories such as a hard disk drive (HDD), a solid state drive (SSD), and a flash memory. In this case, each program such as the control program 121 and the data such as the coating information may be stored in another nonvolatile memory.

The communication I/F 13 is a communication circuit that communicates with the outside of the coating apparatus 1. The coating information is input to the communication I/F 13 from the outside of the coating apparatus 1. Note that the communication I/F 13 may be a communication circuit for wireless communication or a communication circuit for wired communication.

The coating information includes various types of information required for coating the to-be-coated surface. As an example, the coating information includes information regarding a shape and a coating range of the to-be-coated surface, and a thickness of a coating film formed on the to-be-coated surface. Note that the coating information may be acquired from an external memory such as the HDD, the SDD, or the flash memory that may be connected via the input-output I/F 14, or may be acquired from an input device such as a keyboard.

The input-output I/F 14 is an interface circuit connected to the robot arm 15 and the nozzle head 16. The input-output I/F 14 supplies a control signal from the processor 11 to each of the robot arm 15 and the nozzle head 16.

The robot arm 15 moves a position of the nozzle head 16 with respect to the to-be-coated surface along the plurality of paths set. The path is a trajectory of the position of the nozzle head 16 with respect to the to-be-coated surface. The robot arm 15 is configured to move at least one of the nozzle head 16 and an object to be coated. Here, the robot arm 15 is an example of a moving unit.

Hereinafter, as an example, a case where the robot arm 15 moves the nozzle head 16 to move the position of the nozzle head 16 with respect to the to-be-coated surface will be described.

Figure 2:
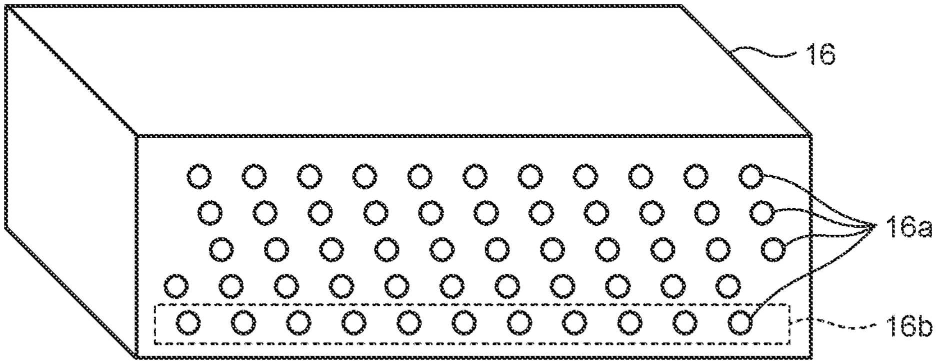
FIG. 2 is a schematic view illustrating an outline of an appearance of a nozzle head according to the embodiment.

The nozzle head 16 is provided at a distal end of the robot arm 15. FIG. 2 is a schematic view illustrating an outline of an appearance of the nozzle head 16 according to the embodiment. As illustrated in FIG. 2, a main body of the nozzle head 16 has, for example, a substantially rectangular shape, but may have other shapes. A nozzle array **16*b* in which a plurality of nozzles 16*a* is arranged is provided on the lower end side of the main body of the nozzle head 16. The coating material is discharged from each of the plurality of nozzles 16*a*. As an example, the plurality of nozzles 16*a* of each nozzle array 16*b* are linearly arranged. In FIG. 2, five nozzle arrays 16*b* are illustrated, but the present invention is not limited thereto. There may be the plurality of nozzle arrays 16*b* of one to four arrays or six or more arrays. As an example, the nozzle arrays 16*b* are arranged at mutually different positions in the width direction of the nozzle head 16. Therefore, by discharging the coating material at different timings from each of the nozzle arrays 16*b*, the coating material can be applied to the to-be-coated surface with higher resolution (accuracy) than in the case of discharging the coating material using one nozzle array 16*b***.

Figure 3:
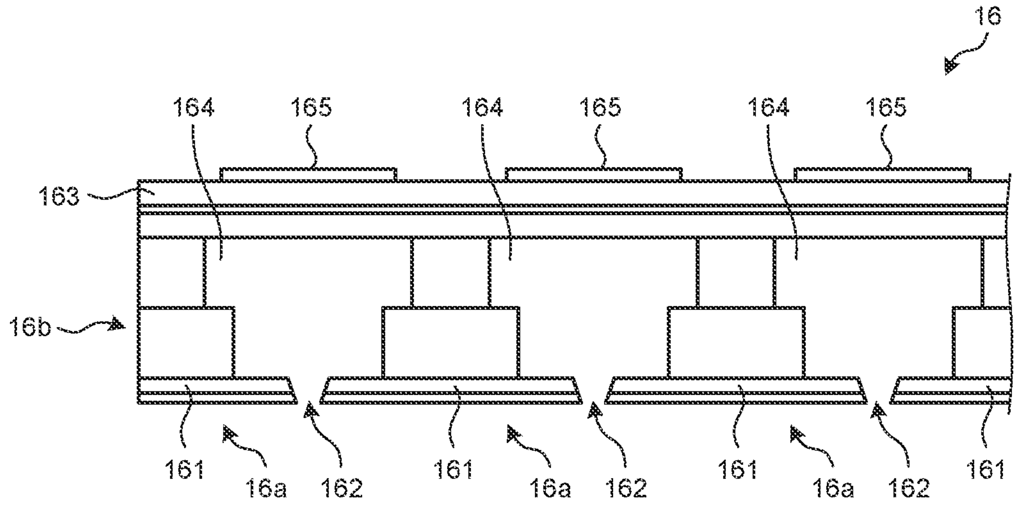
FIG. 3 is a cross-sectional view illustrating an example of a configuration of the nozzle head according to the embodiment.

FIG. 3 is a cross-sectional view illustrating an example of a configuration of the nozzle head 16 according to the embodiment. FIG. 3 illustrates a part of any one of the nozzle arrays **16*b*. As illustrated in FIG. 3, the nozzle head 16 includes a base 161, a piezoelectric diaphragm 163, and an electrode 165. The base 161 is provided with a nozzle hole 162. The base 161 and the piezoelectric diaphragm 163 form a chamber 164. The chamber 164 stores the coating material. The nozzle hole 162 communicates between the chamber 164 and the outside of the nozzle head 16. The electrode 165 is provided on the piezoelectric diaphragm 163 at a position corresponding to each chamber 164. Each electrode 165 applies a voltage to a respective position of the piezoelectric diaphragm 163 according to a control signal from the processor 11. Each position of the piezoelectric diaphragm 163 to which the voltage is applied vibrates. The inside of each chamber 164 is pressurized or depressurized according to the vibration of the piezoelectric diaphragm 163. When the inside of each chamber 164 is depressurized, the coating material is supplied to the inside of each chamber 164. When the inside of each chamber 164 is pressurized, the coating material stored in each chamber 164 is discharged from the nozzle hole 162 communicating with each chamber 164**.

In this manner, the nozzle head 16 can discharge the coating material individually from each of the plurality of nozzles **16*a* in response to the control signal from the processor 11. In other words, the nozzle head 16 has the nozzle array 16*b* in which the plurality of nozzles 16*a* are arranged, and the coating material is discharged from each of the plurality of nozzles 16*a*. Here, the nozzle head 16** is an example of a discharge unit.

The embodiment describes a piezoelectric inkjet head (nozzle head 16) using the piezoelectric diaphragm 163 as an example, but the present invention is not limited thereto. As the nozzle head 16, a thermal type inkjet head that heats the inside of each chamber 164 to discharge the coating material may be used depending on the type of the coating material or the like.

Figure 4:
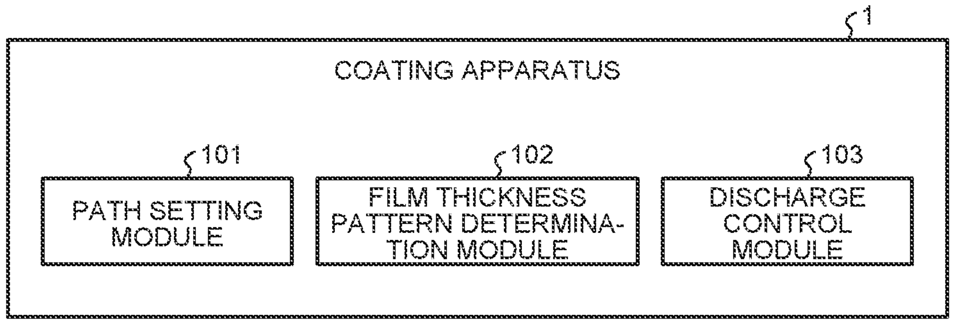
FIG. 4 is a block diagram illustrating an example of a functional configuration of the coating apparatus according to the embodiment.

FIG. 4 is a block diagram illustrating an example of a functional configuration of the coating apparatus 1 according to the embodiment. The processor 11 implements functions as a path setting module 101, a film thickness pattern determination module 102, and a discharge control module 103 by executing the control program 121 (coating program) loaded to the RAM. Here, the path setting module 101 and the film thickness pattern determination module 102 are an example of a control unit.

Figure 5:
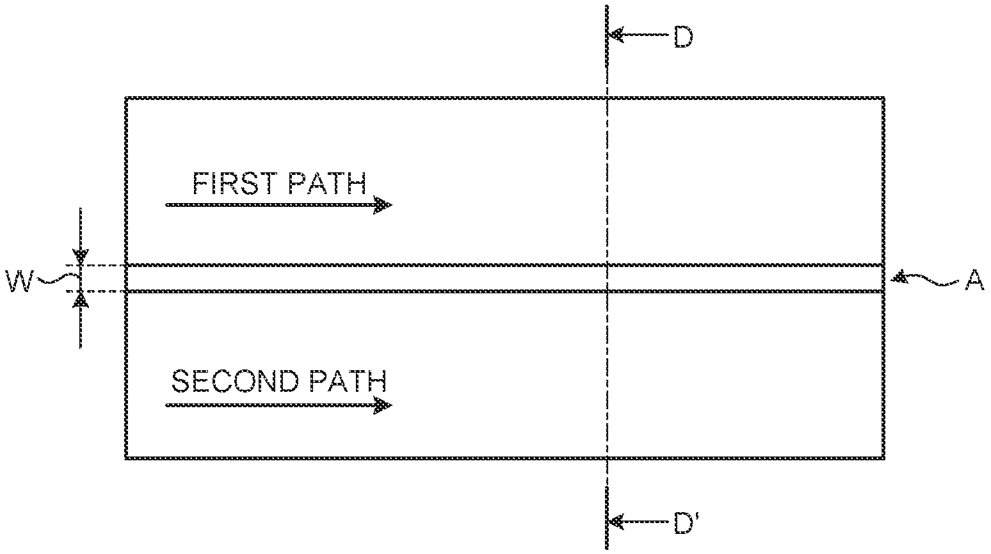
FIG. 5 is a diagram illustrating a coating pattern and a recoated portion according to the embodiment.

FIG. 5 is a diagram illustrating a coating pattern and a recoated portion A according to the embodiment. FIG. 5 illustrates the recoated portion A generated between a belt-like coating pattern of a first path and a belt-like coating pattern of a second path. As illustrated in FIG. 5, the recoated portion A is provided on at least one end portion of each path, and is an area on which the coating material is discharged in an overlapping manner between two adjacent paths among the plurality of paths.

The path setting module 101 sets the plurality of paths for discharging the coating material to the to-be-coated surface based on a width W of the recoated portion A determined by the film thickness pattern determination module 102, the coating information, a coating width per path by the nozzle head 16, and the like.

The film thickness pattern determination module 102 determines the width W of the recoated portion A based on the coating information. As described later, the film thickness pattern determination module 102 may also be expressed as determining the width W (recoating width) of the recoated portion A based on information (coating information) regarding fluidity of the coating material on the to-be-coated surface. In other words, the coating apparatus 1 according to the embodiment is a device capable of arbitrarily setting an optimum recoating width in accordance with the fluidity of the coating material after application that depends on, for example, a film thickness, a viscosity, and a curvature condition of a product (to-be-coated surface).

Alternatively, the coating apparatus 1 according to the embodiment is a device that performs coating with the optimum recoating width that can be arbitrarily set in accordance with the fluidity of the coating material after application that depends on, for example, the film thickness, the viscosity, and the curvature condition of the product (to-be-coated surface).

The film thickness pattern determination module 102 determines the width W of the recoated portion A in consideration of a balance between a viewpoint of ease of mixing of the coating material between adjacent paths and a viewpoint of suppression of sagging of the coating material at an end portion of the coating film. This is because, when the fluidity of the coating material after application is high, the coating material between the adjacent paths is easily mixed, but sagging of the coating material easily occurs at the end portion of the coating film between the adjacent paths.

As an example, the film thickness pattern determination module 102 determines the width W of the recoated portion based on the film thickness of the coating film formed on the to-be-coated surface, that is, the film thickness of the coating material applied to the to-be-coated surface. Specifically, the film thickness pattern determination module 102 reduces the width W of the recoated portion A from the viewpoint of ease of mixing of the coating material between the adjacent paths. On the other hand, from the viewpoint of suppression of the sagging of the coating material at the end portion of the coating film, the film thickness pattern determination module 102 increases the width W of the recoated portion A as the film thickness increases. The width W is determined as above based on the fact that the sagging of the coating material increases at the end portion of the coating material discharged in a belt-like state on the to-be-coated surface as the film thickness increases.

As another example, the film thickness pattern determination module 102 determines the width W of the recoated portion based on a shape of the to-be-coated surface. Specifically, from the viewpoint of ease of mixing of the coating material between the adjacent paths, the film thickness pattern determination module 102 decreases the width W of the recoated portion A as the curvature of the to-be-coated surface increases. In addition, from the viewpoint of ease of mixing of the coating material between the adjacent paths, the film thickness pattern determination module 102 decreases the width W of the recoated portion A as a deviation between a normal direction and a gravity direction of the to-be-coated surface (inclination of the to-be-coated surface) increases. On the other hand, from the viewpoint of suppression of the sagging of the coating material at the end portion of the coating film, the film thickness pattern determination module 102 increases the width W of the recoated portion A as the curvature of the to-be-coated surface increases. In addition, from the viewpoint of suppression of the sagging of the coating material at the end portion of the coating film, the film thickness pattern determination module 102 increases the width W of the recoated portion A as the inclination of the to-be-coated surface increases. The width W is determined as above based on the fact that the sagging of the coating material increases at the end portion of the coating material discharged in the belt-like state on the to-be-coated surface as the curvature or inclination of the to-be-coated surface increases.

As another example, the film thickness pattern determination module 102 determines the width W of the recoated portion based on the viscosity of the coating material on the to-be-coated surface. Specifically, from the viewpoint of ease of mixing of the coating material between the adjacent paths, the film thickness pattern determination module 102 increases the width W of the recoated portion A as the viscosity increases. On the other hand, from the viewpoint of suppression of the sagging of the coating material at the end portion of the coating film, the film thickness pattern determination module 102 decreases the width W of the recoated portion A as the viscosity increases. The width W is determined as above based on the fact that the fluidity of the coating material decreases as the viscosity of the coating material increases, and therefore the coating film between the adjacent paths is less likely to mix due to less fluidity of the coating material applied between the adjacent paths. Here, the coating material on the to-be-coated surface is more viscous as the viscosity of the coating material increases. Therefore, from the viewpoint of ease of mixing of the coating material between adjacent paths, the film thickness pattern determination module 102 increases the width W of the recoated portion A as the viscosity of the coating material increases. On the other hand, from the viewpoint of suppression of the sagging of the coating material at the end portion of the coating film, the film thickness pattern determination module 102 decreases the width W of the recoated portion A as the viscosity of the coating material increases. The viscosity of the coating material on the to-be-coated surface is not limited to the viscosity of the coating material to be applied, and may vary depending on a type of a coating film (base) applied in advance on the to-be-coated surface and surface properties such as roughness of the to-be-coated surface. Therefore, the coating information includes information on the viscosity of the coating material and a condition of the to-be-coated surface at the time of coating.

Figure 6:
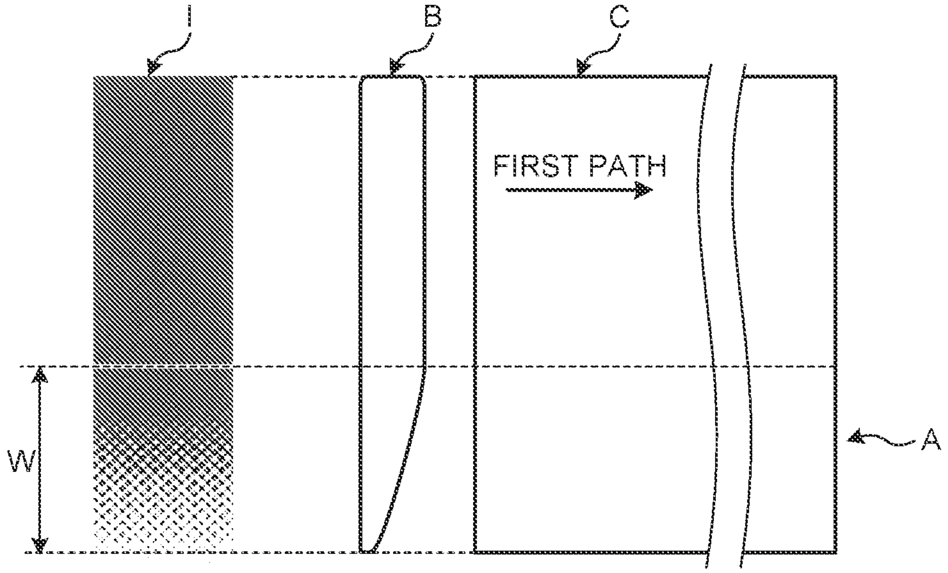
FIG. 6 is a diagram illustrating determination of a discharge amount from each nozzle according to the embodiment.

The film thickness pattern determination module 102 determines a discharge amount per path from each of the plurality of nozzles 16*a* of the nozzle array 16*b*. FIG. 6 is a diagram illustrating determination of the discharge amount from each of the nozzles 16*a* according to the embodiment. FIG. 6 illustrates a film thickness pattern B related to a coating pattern C of the first path in FIG. 5 and image data I for forming the coating film having the film thickness pattern B on the to-be-coated surface. As illustrated in FIG. 6, the film thickness pattern B of each path has a substantially trapezoidal shape, and has an inclined portion in the recoated portion A. The film thickness of the inclined portion gradually decreases from a central portion to the end portion of each path. A distribution of the discharge amount from the nozzle head 16 as the inkjet head corresponds to a concentration distribution (gradation) of the image data I. Therefore, the concentration indicated by the image data I gradually decreases from the central portion to the end portion of each path according to the film thickness distribution of the film thickness pattern B. A small concentration in the image data I means that the discharge amount from the nozzle 16*a* at the corresponding position is small.

As described above, the film thickness pattern determination module 102 makes the discharge amount from each nozzle 16*a* of the nozzle array 16*b* corresponding to the recoated portion A smaller than the discharge amount from other nozzles 16*a* of the nozzle array 16*b*. As an example, the discharge amount from each nozzle 16*a* corresponding to the recoated portion A gradually decreases toward the adjacent path. Here, the number of the nozzles 16*a* corresponding to the recoated portion A in the nozzle array 16*b* corresponds to the width W.

Note that although FIG. 5 illustrates two paths for simplicity, the number of paths may be three or more. Therefore, the film thickness pattern determination module 102 sets the recoated portion A according to the presence or absence of the adjacent path. In other words, the film thickness pattern determination module 102 determines the film thickness pattern B according to the presence or absence of the adjacent path. When the adjacent path is present on both sides, the recoated portion A is provided at the end portions on both sides of the coating pattern C. On the other hand, when the adjacent path exists only on one side, the recoated portion A is provided only at the end portion on an opposite side of the coating pattern C. Naturally, the recoated portion A may be provided on both sides in a part of one path, and the recoated portion A may be provided on one side in another part. In addition, directions of the first path and the second path may be opposite. In this case, the film thickness pattern determination module 102 determines the discharge amount from each nozzle 16*a* according to a path direction.

In the configuration illustrated in FIG. 3, the discharge amount from each nozzle 16*a* is defined by the number of times of discharge per unit time from each nozzle 16*a*. In this case, it may be expressed that the film thickness pattern determination module 102 determines the number of times of discharge per unit time from each nozzle 16*a*.

Note that, for example, a relationship between the film thickness in the inclined portion and a position of the coating pattern C from the end portion may be set in advance and stored in the memory 12 or the like, or may be determined by the film thickness pattern determination module 102 according to the fluidity of the coating material on the to-be-coated surface. Here, the relationship between the film thickness in the inclined portion and the position of the coating pattern C from the end portion may be linear or non-linear. In addition, the film thickness in the inclined portion is not limited to a gradual change, and may have a stepwise distribution.

The discharge control module 103 controls the position of the robot arm 15 to move the nozzle head 16 along each of the plurality of paths such that the nozzle array 16*b* is substantially orthogonal to each path. The discharge control module 103 controls an individual discharge amount from each nozzle 16*a*, while moving the nozzle head 16, based on the image data I of each path.

Note that the coating apparatus 1 according to the embodiment may be configured as a coating system including a coating pattern determination device (coating planning device) that realizes the path setting module 101 and the film thickness pattern determination module 102, and a coating apparatus that realizes the discharge control module 103. Here, the coating apparatus that realizes the discharge control module 103 may not be provided. In other words, the technology according to the embodiment may also be realized as the coating pattern determination device (coating planning device) capable of arbitrarily setting the optimum recoating width in accordance with the fluidity of the coating material after application that depends on, for example, the film thickness, the viscosity, and the curvature condition of the product (to-be-coated surface).

Figure 7:
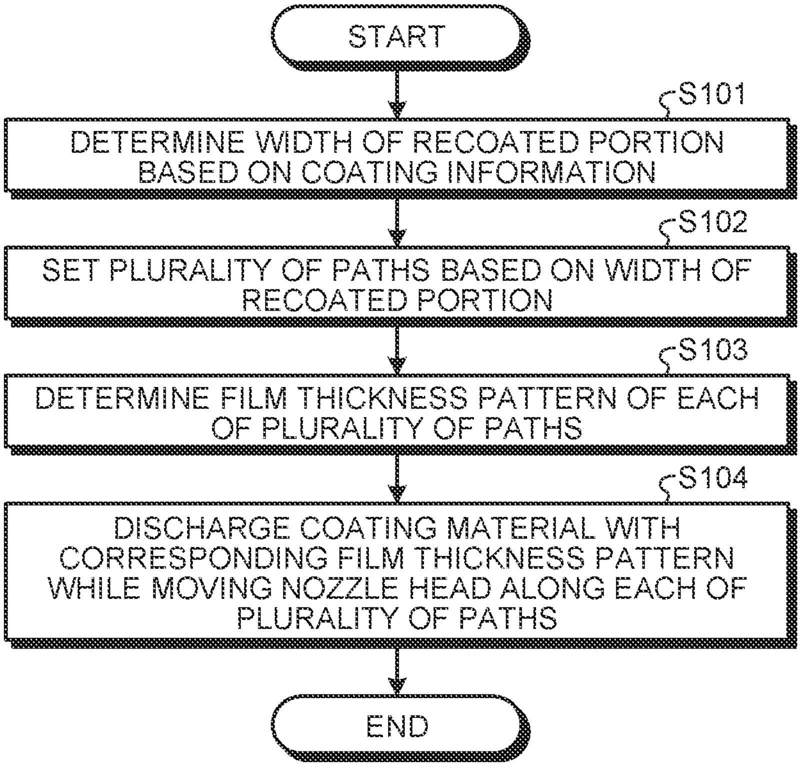
FIG. 7 is a flowchart illustrating an example of a process executed by the coating apparatus according to the embodiment.

Here, a process executed by the coating apparatus 1 according to the embodiment will be described with reference to the drawings. FIG. 7 is a flowchart illustrating an example of the process executed by the coating apparatus 1 according to the embodiment.

Figure 8:
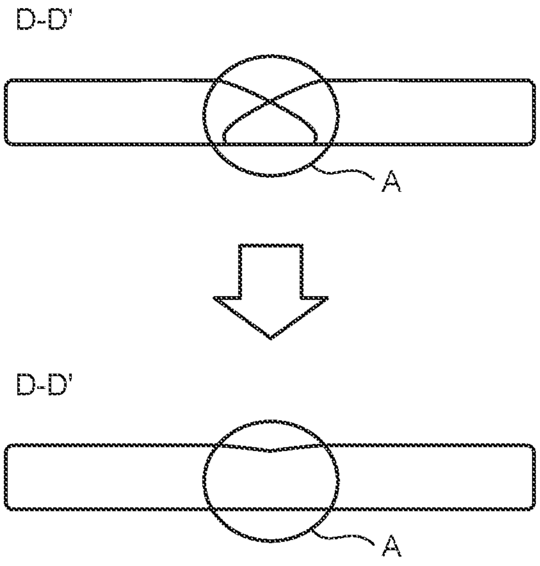
FIG. 8 is a diagram illustrating application of a coating material to the recoated portion according to the embodiment.

The film thickness pattern determination module 102 determines the width W of the recoated portion A based on the coating information (S101). The path setting module 101 sets the plurality of paths based on the width W of the recoated portion determined by the film thickness pattern determination module 102 (S102). In other words, the path setting module 101 sets the plurality of paths so as to generate the recoated portion A on which the coating material is discharged in the overlapping manner between the two adjacent paths among the plurality of paths. The film thickness pattern determination module 102 determines the film thickness pattern B of each of the plurality of paths set by the path setting module 101 (S103). FIG. 8 is a diagram illustrating the application of the coating material to the recoated portion A according to the embodiment. An upper part of FIG. 8 illustrates the film thickness pattern B of each path corresponding to D-D' in FIG. 5. As illustrated in the upper part of FIG. 8, the film thickness pattern determination module 102 determines the film thickness pattern B of each path so that the film thickness of the recoated portion A gradually decreases. In other words, the film thickness pattern determination module 102 determines the discharge amount from each of the plurality of nozzles 16*a* for each path so that the discharge amount from each nozzle 16*a* at the end portion of the nozzle array 16*b* corresponding to the recoated portion A is less than the discharge amount from each of other nozzles 16*a* of the nozzle array 16*b*.

The discharge control module 103 discharges the coating material with the corresponding film thickness pattern B determined by the film thickness pattern determination module 102 while moving the nozzle head 16 along each of the plurality of paths determined by the path setting module 101 (S104). In other words, the discharge control module 103 recoats the two adjacent paths with the film thickness pattern B determined so that the film thickness of the recoated portion A gradually decreases. A lower part of FIG. 8 schematically illustrates a cross section of the coating film taken along line D-D' in FIG. 5. When two paths are recoated in the film thickness pattern B having the inclined portion, the film thickness per path applied in the recoated portion A is small. For this reason, the coating material recoated in the film thickness pattern B having the inclined portion flows in the recoated portion A as illustrated in the lower part of FIG. 8 as compared with the case where the inclined portion is not provided, and is in a state of being easily mixed.

Note that, for example, the determination of the film thickness pattern B (S103) and the discharge (S104) may be repeated for each path.

As described above, in the embodiment, the width W of the recoated portion A on which the coating material is discharged in the overlapping manner between the two adjacent paths among the plurality of paths is determined based on the coating information, and the discharge amount from each of the plurality of nozzles 16*a* is determined so that the discharge amount from each nozzle 16*a* at the end portion of the nozzle array 16*b* corresponding to the recoated portion A is less than the discharge amount from each of other nozzles 16*a* of the nozzle array 16*b*.

In other words, in the embodiment, by individually controlling each of the plurality of nozzles 16*a* by taking advantage of a characteristic of the inkjet, the two adjacent paths are recoated in the film thickness pattern B determined so that the film thickness of the recoated portion A gradually decreases. According to the configuration of the above embodiment, even when a highly-viscous coating material, such as a coating material for automobile coating, is used, the coating material applied has the fluidity (flow) for easy mixing between the adjacent paths. In addition, it is also possible to suppress the occurrence of the sagging of the coating material at the end portion of the coating film between the adjacent paths. Therefore, according to the embodiment, even when the positional accuracy (trajectory accuracy) of the nozzle head 16 with respect to the to-be-coated surface is lower than the required coating accuracy, it is possible to suppress deterioration of coating quality between the adjacent paths (recoated portion A).

Furthermore, according to the embodiment, it is possible to realize the liquid film or liquid column coating with less scattering of atomized coating material by applying the inkjet to automobile coating, thereby improving the coating efficiency and working environment. Improvement in the coating efficiency and the working environment contributes to reduction of initial cost and energy cost required for a coating booth.

Furthermore, in the embodiment, by determining the film thickness pattern B according to the presence or absence of the adjacent path, the coating material can be easily mixed between the adjacent paths, and an edge can be provided at the end portion of the coating material applied in the plurality of paths. Therefore, according to the embodiment, two-tone coating without masking can be realized. The two-tone coating without masking contributes to reduction in cost required for the two-tone coating.

Note that the control program 121 executed by the coating apparatus 1 of the embodiment may be provided by being incorporated in advance in the ROM or the like in the memory 12, may be provided by being recorded in a computer-readable recording medium such as a CD-ROM, a flexible disk (FD), a CD-R, or a digital versatile disk (DVD) as a file in an installable format or an executable format, or may be provided or distributed via a network such as the Internet.

Furthermore, the control program 121 executed by the coating apparatus 1 of the embodiment may be provided by being stored on a computer connected to a network such as the Internet and downloaded via the network.

According to the present invention, it is possible to suppress deterioration of coating quality between adjacent paths.

Although the embodiment according to the present invention has been described above, the present invention is not limited to the above-described embodiment as it is, and the components can be modified and embodied in the implementation stage without departing from the gist of the present invention. In addition, various inventions can be formed by appropriately combining a plurality of components disclosed in the above described embodiment. For example, some components may be deleted from all the components described in the embodiment.

The invention claimed is:

1. A coating apparatus for coating an automobile, the apparatus comprising:

a discharge unit including a nozzle array in which a plurality of nozzles is arranged, the discharge unit being configured to discharge a coating material from each of the plurality of nozzles;

a robot arm configured to move a position of the discharge unit with respect to a to-be-coated surface along a plurality of paths substantially orthogonal to the nozzle array;

a communication interface configured to obtain coating information input from an external device;

a memory that stores the coating information, the coating information including information on fluidity after application of the coating material with viscosity for automobile coating on the to-be-coated surface on a range of the automobile, the coating information including information on a viscosity of the coating material; and processing circuitry configured to:

read, from the memory, the coating information;

determine, based on the read coating information, a width of an overlapped portion on which the coating material is discharged in an overlapping manner between two adjacent paths among the plurality of paths, the width of the overlapped portion increasing as the viscosity of the coating material increases;

determine a discharge amount from each of the plurality of nozzles wherein a distribution of the determined discharge amount from each of the nozzles corresponds to a concentration distribution of image data in which a concentration within the overlapped portion decreases as going toward an end of each of the two paths in a width direction, a number of times of discharge per unit time from each of the nozzles at an end of the nozzle array corresponding to the overlapped portion is smaller than a number of times of discharge per unit time from each of other nozzles of the nozzle array, and a smaller number of times of discharge per unit time corresponds to a less film thickness after application; and cause, for each of the two adjacent paths, the discharge unit to discharge the coating material by a smaller number of times of discharge per unit time as the concentration in the image data is lower while moving the discharge unit by the robot arm.

2. The coating apparatus according to claim 1, wherein the processing circuitry is configured to decrease more the discharge amount from each of the plurality of nozzles corresponding to the width of the overlapped portion at the end of the nozzle array as the corresponding nozzle is closer to the adjacent path.

3. The coating apparatus according to claim 1, wherein the coating information includes information on a film thickness of the coating material to be applied onto the to-be-coated surface, and the processing circuitry is configured to determine the width of the overlapped portion based on the film thickness.

4. The coating apparatus according to claim 1, wherein the coating information includes information on a shape of the to-be-coated surface, and the processing circuitry is configured to determine the width of the overlapped portion based on a curvature or an inclination of the to-be-coated surface.

* * * * *